United States Patent
Bauer et al.

(10) Patent No.: US 10,805,066 B2
(45) Date of Patent: Oct. 13, 2020

(54) CRYPTOGRAPHIC ALGORITHM HAVING A KEY-DEPENDENT MASKED COMPUTING STEP (SBOX CALL)

(71) Applicant: GIESECKE + DEVRIENT MOBILE SECURITY GMBH, Munich (DE)

(72) Inventors: Sven Bauer, Vaterstetten (DE); Hermann Drexler, Munich (DE); Jürgen Pulkus, Munich (DE)

(73) Assignee: GIESECKE + DEVRIENT MOBILE SECURITY GMBH, Munich (DE)

( * ) Notice: Subject to any disclaimer, the term of this patent is extended or adjusted under 35 U.S.C. 154(b) by 369 days.

(21) Appl. No.: 16/060,543

(22) PCT Filed: Dec. 7, 2016

(86) PCT No.: PCT/EP2016/002064
§ 371 (c)(1),
(2) Date: Jun. 8, 2018

(87) PCT Pub. No.: WO2017/097418
PCT Pub. Date: Jun. 15, 2017

(65) Prior Publication Data
US 2018/0367297 A1 Dec. 20, 2018

(30) Foreign Application Priority Data

Dec. 8, 2015 (DE) .................... 10 2015 015 953

(51) Int. Cl.
*H04L 9/06* (2006.01)
*H04L 9/00* (2006.01)
(Continued)

(52) U.S. Cl.
CPC .............. *H04L 9/0631* (2013.01); *G09C 1/00* (2013.01); *H04L 9/002* (2013.01); *H04L 9/0618* (2013.01);
(Continued)

(58) Field of Classification Search
None
See application file for complete search history.

(56) References Cited

U.S. PATENT DOCUMENTS

| 5,003,596 A | * | 3/1991 | Wood | H04L 9/002 380/264 |
| 7,602,916 B1 | | 10/2009 | Vater et al. | |

(Continued)

FOREIGN PATENT DOCUMENTS

| DE | 102004032893 A1 | 2/2006 |
| DE | 102014004378 A1 | 10/2015 |

(Continued)

OTHER PUBLICATIONS

Bos et al., "Differential Computation Analysis: Hiding your White-Box Designs is Not Enough," 2015, 22 Pages.
(Continued)

*Primary Examiner* — Joseph P Hirl
*Assistant Examiner* — Hassan Saadoun
(74) *Attorney, Agent, or Firm* — Workman Nydegger

(57) ABSTRACT

A processor device has an executable implementation of a cryptographic algorithm implemented thereon, which algorithm is adapted to produce an output text from an input text employing a secret key K. The implementation of the algorithm comprises a key-dependent computing step S which comprises a key combination of input values x derived directly or indirectly from the input text with key values SubK derived directly or indirectly from the key; the key-dependent computing step S is represented by a table which is masked with input masking and/or output masking to form a masked table TabSSubK; and a new masked table TabSKneu is generated in the processor device.

11 Claims, 3 Drawing Sheets

(51) Int. Cl.
*H04L 9/08* (2006.01)
*G09C 1/00* (2006.01)
*H04L 9/14* (2006.01)

(52) U.S. Cl.
CPC .......... *H04L 9/0625* (2013.01); *H04L 9/0819* (2013.01); *H04L 9/14* (2013.01); *H04L 2209/043* (2013.01); *H04L 2209/122* (2013.01); *H04L 2209/16* (2013.01); *H04L 2209/24* (2013.01)

(56) References Cited

U.S. PATENT DOCUMENTS

| | | | |
|---|---|---|---|
| 8,699,702 B2 | 4/2014 | Farrugia et al. | |
| 2012/0093313 A1* | 4/2012 | Michiels | G09C 1/00 380/255 |
| 2017/0324542 A1 | 11/2017 | Drexler et al. | |
| 2017/0324543 A1 | 11/2017 | Drexler et al. | |
| 2017/0324547 A1 | 11/2017 | Drexler et al. | |
| 2017/0352298 A1 | 12/2017 | Drexler et al. | |
| 2018/0167196 A1* | 6/2018 | Cooper | H04L 9/003 |

FOREIGN PATENT DOCUMENTS

| | | |
|---|---|---|
| DE | 102014016548 A1 | 5/2016 |
| EP | 1110185 A1 | 6/2001 |
| WO | 2010146139 A1 | 12/2010 |
| WO | 2010146139 A9 | 3/2012 |

OTHER PUBLICATIONS

Chow et al., "A White-Box DES Implementation for DRM Applications," Pre-proceedings for ACM DRM-2002 Workshop, Oct. 15, 2002, 16 Pages.

Muir, "A Tutorial on White-Box AES," Advances in Network Analysis and its Applications, Mathematics in Industry, vol. 18, Irdeto Canada, http://www.irdeto.com, Feb. 22, 2013, pp. 209-229.

German Office Action from DE Application No. 102015015953.4, dated Jul. 11, 2016.

International Search Report from PCT Application No. PCT/EP2016/002064, dated Feb. 23, 2017.

* cited by examiner

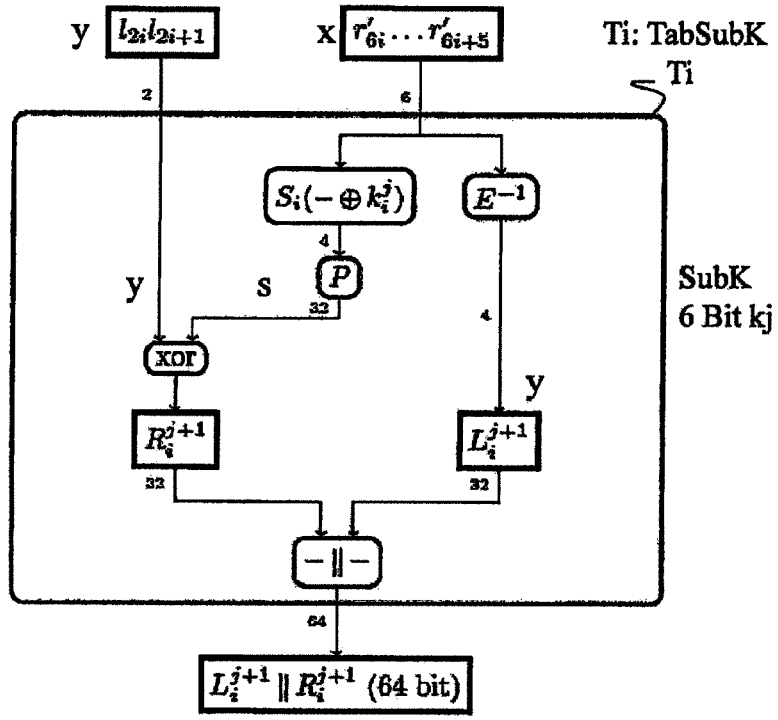

Fig. 3

Multiplication of the matrix of the linear mapping $A$ with a data vector:

$$w = T'(s,y) \qquad f = A = MA \qquad (s,y) = (S(x), y)$$

$$\begin{pmatrix} \sigma_0 \\ \vdots \\ \sigma_{l-1} \end{pmatrix} = \begin{pmatrix} a_{0,0} & \cdots & a_{0,n-1} \\ \vdots & & \vdots \\ a_{l-1,0} & \cdots & a_{l-1,n-1} \end{pmatrix} \begin{pmatrix} a_{0,n} & \cdots & a_{0,n+m-1} \\ \vdots & & \vdots \\ a_{l-1,n} & \cdots & a_{l-1,n+m-1} \end{pmatrix} \cdot \begin{pmatrix} s_0 \\ \vdots \\ s_{n-1} \\ y_0 \\ \vdots \\ y_{m-1} \end{pmatrix}$$

Columns with coefficients of the $s_j$.  Columns with coefficients of the $y_j$.

Each $\sigma_i$ is a linear combination of the $s_j$ and $y_j$:

$$\sigma_i = \sum_{j=0}^{n-1} a_{i,j} s_j + \sum_{j=0}^{m-1} a_{i,n+j} y_j$$

Fig. 4

CRYPTOGRAPHIC ALGORITHM HAVING A KEY-DEPENDENT MASKED COMPUTING STEP (SBOX CALL)

FIELD OF THE INVENTION

The invention relates to a processor device with an implementation of a cryptographic algorithm such as DES or AES comprising a key-dependent masked computing step. In particular, the invention relates to the technical field of protecting the crypto-algorithm against attacks by means of white box cryptography and an implementation of a crypto-algorithm in a representation which is adapted to white box cryptography.

BACKGROUND OF THE INVENTION

A processor device within the meaning of the invention is understood as a device or other object with a processor, for example a mobile terminal, such as e.g. a smart phone. Security-critical data employed by the cryptographic algorithm, such as e.g. PINs, passwords, cryptographic keys, etc., are supplied to the processor device in secured manner. Traditionally, security-critical data are secured by (grey box) cryptography to protect them against an attack by unauthorized persons. For this purpose, the data are supplied on a security element of the mobile terminal, the security element being independent with regard to hardware, for example a SIM card removable from the mobile terminal.

Current processor devices commonly have flash memories as memory for applications and for cryptographic algorithms. In this way, applications and algorithms can be changed later on. Formerly customary EEPROM and ROM memories are superseded increasingly.

An alternative approach, which is applicable particularly also for mobile terminals that do not have an independent security element, is based on white box cryptography. With a white box implementation of a cryptographic algorithm it is attempted to so conceal the security-critical data, in particular secret cryptographic keys, in the implementation that an attacker who has full access to the implementation is not in a position to extract the security-critical data from the implementation. A white box implementation of the AES crypto-algorithm (AES=Advanced Encryption Standard) is known for example from the publication [1] "A Tutorial on White-box AES" by James A. Muir, Cryptology ePrint Archive, Report 2013/104. Likewise, white box implementations of cryptographic algorithms or routines are distributed commercially.

An ideal white box implementation of a crypto-algorithm holds security-critical data such as cryptographic keys concealed such that they cannot be ascertained by an attack.

In the patent application DE 10 2014 016 548.5 of the applicant of the present patent application, a method is described for testing a white box implementation of a cryptographic algorithm executable on a processor, with which the inventors have been able to ascertain security-critical data by an attack, which should actually be impossible according to the concept of the white box. From this point of view, the tested white box implementations are no longer perfect white box by definition, due to their vulnerability, but will still be referred to hereinafter as white box implementations, due to their objective of being perfect.

In the specialist publication [3] "Differential Computation Analysis: Hiding your White-Box Designs is Not Enough", J. W. Bos, Ch. Hubain, W. Michiels, and Ph. Teuwen, eprint.iacr.org/2015/753, of the company NXP is a similar test method is disclosed as in the above-referenced patent application 10 2014 016 548.5, by which method the secret key could likewise be ascertained by statistical methods from a white box implementation of a crypto-algorithm.

The inventors of the present application have developed three design rules for a function f, with which function f a cryptographic algorithm, in particular a block cipher such as the Data Encryption Standard DES (or also AES) can be white-box masked such that the attack described in the patent application 10 2014 016 548.5 is prevented or at least made very difficult. The basic principle here is to combine output values of security-critical computing steps with values/bits statistically independent therefrom, so-called obfuscating values/bits y. Statistically independent means here that the output values of the computing step S[x] while the input value x varies randomly do not or only to a small degree correlate with the obfuscating values/bits. These design rules are described in separate patent applications. The design rules were initially developed on the basis of the standard representation of crypto-algorithms, in particular of the Data Encryption Standard DES, and turned out to be memory-intensive and cumbersome to realize. In a further application, the inventors describe an alternative DES representation to which the developed design rules for the function f are easier to apply to crypto-algorithms, particularly the DES. In the document [4] "A White-Box DES Implementation for DRM Applications", S. Chow, P. Eisen, H. Johnson, P. C. van Oorschot, pre-proceedings for ACM DRM-2002 Oct. 15, 2002, the authors found that a white box implementation of the DES is demanding (e.g. [4] page 2, para. 5) and developed an alternative representation of the DES which can be expanded to a white box implementation more easily.

The DES has several rounds, and in different rounds of the DES usually different round keys are employed. The two above-referenced alternative DES representations with white box maskings therefore usually require a different table for the key-dependent computing step in each round. Thus, the two alternative DES representations contain a multiplicity of key-dependent tables. Consequently, these alternative DES representations have high memory requirements. Further, the crypto-algorithm has to be supplied with new key-dependent tables upon each key update, for example transmitted from the outside to the processor device in which the algorithm is implemented. Thus, key updates are communication- and memory-intensive.

The document WO 2010146139 A9 discloses a white box implementation for the AES according to the preamble of claim 1 to the extent in which the scope of claim 1 is directed at the algorithm AES. Here, the two computing steps occurring in one round of the AES, SubBytes, wherein an S-box operation is contained, and AddRoundKey, wherein the key employed is incorporated, are combined into a single key-dependent computing step. In this way, the key employed is hidden in the S-box operation. The document WO 2010146139 A9 further discloses key-dependent computing steps in which XOR and SBOX operation are joined, and which are realized by key-dependent look-up tables (in the document also called T-boxes T), and a key update method for such key-dependent look-up tables (T-boxes). The T-boxes (FIG. 9: boxes 920+930) are present in the form of T-boxes white-box masked with functions $Uk=a°Tk°a^{-1}$, wherein k is a currently employed round key. In order to effect a key update on the masked T-box Uk from the current key k to a new key k^ at the runtime of the algorithm, a key-update information item, called "Key Substitute" (FIG. 6: box 664; FIG. 9: operation 990, FIG. 10a-c: boxes 665, 666+667, 668), which is computed in accordance with t=a(k XOR k^), is applied to input data for the masked T-box Uk via a "key translation unit" (FIG. 6: box 620). Thereby, at the runtime of the algorithm, upon performing a table call in the masked T-box U, such a table output is produced like the one that would have been produced with an updated masked T-box Uk^ with the new key k^. In the implementation, however, the unchanged, original, masked T-box Uk produced with the old key is maintained. In the implementation there are added the "key translation unit" and memory areas for the key update information "Key substitute".

A disadvantage of the solution from WO 2010146139 A9 is that the additional "key translation units" increase both the runtime and the memory requirements of the implementation.

A further disadvantage of the solution from WO 2010146139 A9 is that the modified implementation now contains information about the new as well as the old key. It has to be assumed that the now present information on two different keys will facilitate some attacks on white box implementations, for example by statistical evaluation.

In the literature, white box implementations are analyzed in view of to what extent they are prone to certain classes of attacks. A modification of a white box implementation has the effect that the results of analyses of attack classes can no longer be applied in order to assess the security level of the now modified implementation. The white box implementation is modified through the additional "key translation units". Possible analyses of attack classes must thus be performed newly from scratch.

The invention has the object of specifying a processor device having an implementation of a cryptographic algorithm, for example DES or AES, comprising a white-box masked key-dependent computing step which permits a memory-saving, communication-saving, secure and efficient key update on the key-dependent computing step. Further, in an algorithm with several rounds where different keys are employed in different rounds, the implementation is to permit a memory- and communication-saving realization of the key-dependent computing step for said several rounds.

SUMMARY OF THE INVENTION

The object is achieved by a processor device according to claim 1. Embodiments of the invention are specified in the dependent claims.

The processor device according to claim 1 is equipped with an executable implementation of a cryptographic algorithm (such as AES or DES) implemented thereon. The algorithm is adapted to produce an output text from an input text employing a secret key K. The implementation of the algorithm comprises a masked key-dependent computing step T', which comprises a key combination of input values x derived directly or indirectly from the input text with key values SubK derived directly or indirectly from the key. The masked key-dependent computing step T' is represented by a table in the implementation, said table being masked with an input masking, and/or an output masking to form a masked table $TabS_{SubK}$. The processor device further comprises a key update device adapted to carry out a key update method on the masked key-dependent computing step T' from the derived key value SubK to a new derived key value SubKneu. In the key update method there are further supplied key change data to the processor device, in particular to the key update device, said key change data being computed employing the derived key value SubK, the new derived key value SubKneu and the employed input masking and/or output masking.

The invention is characterized in that in the key update method there is further generated, by means of the key change data, a new masked table $TabS_{Kneu}$ in the processor device, in particular in the key update device, said new masked table being adapted to compute the key-dependent computing step S for the new derived key value SubKneu by means of the new masked table $TabS_{Kneu}$. The new masked table $TabS_{Kneu}$ is implemented in the processor device so that the new masked table $TabS_{Kneu}$ will be available in the processor device later, at the runtime of the algorithm.

The key change data have low memory requirements in comparison to a full second table for a second key. Thus, the implementation is memory-saving due to employing the key change data. The transfer of the key change data to the processor device simultaneously means a small volume of data to be communicated.

The original masked table $TabS_K$ is no longer needed and can even be overwritten with the new masked table $TabS_{Kneu}$, if desired. Further memory space can be saved in this manner. In addition, in the event that the new masked table $TabS_{Kneu}$ is overwritten onto the original masked table, any information about the original key is removed from the implementation. The information remaining in the implementation is continuously information on the new key. Possible statistical and similar attacks are precluded thereby and security is increased.

The implementation itself remains unchanged by the key update, since merely an old table $TabS_K$ is replaced by a new, structurally identical table $TabS_{Kneu}$. Analyses of attack classes that have been performed on a processor device without key update device can therefore be re-used for the processor device with the key update device according to the invention. In particular, the implementation contains no additional implemented operations such as for example the "key translation unit" required in the solution of WO 2010146139 A9. The efficiency (execution speed, computing speed) of the implementation at the runtime of the algorithm is retained thereby and is not increased in particular. Further, the key update according to the invention is performed already before the runtime of the algorithm, namely in the phase after the application that uses the algorithm has received the key change data. At the runtime, when the algorithm is executed, merely a key-dependent table call has to be performed on the new masked table $TabS_{Kneu}$. These effects increase the efficiency of the implementation. This is important particularly for applications in which the execution of the algorithm is integrated in a contactless data transfer, since very short transaction times are desired here. As a typical example payment applications on mobile telephones should be mentioned here, which are connected to the payment terminal via an NFC interface (near field communication).

Therefore, according to claim 1 a processor device is created with an implementation of a cryptographic algorithm, for example DES or AES, comprising a white-box masked key-dependent computing step, which permits a memory-saving, communication-saving, secure and efficient key update on the key-dependent computing step.

Optionally, the processor device comprises a changeable memory device, in particular a flash memory, in which the implementation is set up.

The key change data preferably have lower memory requirements than the masked table.

Optionally, the algorithm comprises several rounds j= 1, ..., n. As the derived key value SubK there is provided a round-key part of a round key kj of a round j that is processed by the masked key-dependent computing step T'. As the new derived key value SubKneu there is provided a round-key part of a round key of a different round 1, in particular of a round j+1 following the round, that is processed by the masked key-dependent computing step T'. By means of the change key data from the masked table $TabS_K$ of the round, the new masked table $TabS_{Kneu}$ of a different round, in particular the subsequent round, is derived thereby. This method has the advantage that one can derive several tables $TabS_{Kneu}$ with different round-key parts $K_{neu}$ from one table $TabS_K$. Thus, from one stored table, tables of other rounds can be generated at any given time, thus saving memory space. A disadvantage is that the newly generated tables have the same masking as the original table and the security of the implementation is thus reduced by this method.

Optionally, the algorithm comprises a multiplicity of n, in particular 10 (AES) or 16 (DES), rounds, wherein for a part of the rounds, the respective new masked table $TabS_{Kneu}$ is derived employing key change data from the respective masked table $TabS_K$ of a different round, in particular of a round preceding the round. In particular, it is thus possible to compute from round to round, throughout the whole algorithm, the new masked table $TabS_{Kneu}$ for the round key of the new round from the masked table $TabS_K$ of the respective preceding round.

Optionally, the processor device is adapted to supply at the runtime, while the algorithm is executed on the processor device, two or several tables for the computing step S, said tables being masked with two or several different input maskings and/or output maskings to form masked tables $Tab1S_{SubK}$, $Tab2S_{SubK}$, $Tab3S_{SubK}$, ..., wherein the new masked table $TabS_{Kneu}$ containing the new key $Sub_{Kneu}$ is generated from one of the masked tables $Tab1S_{SubK}$, $Tab2S_{SubK}$, $Tab3S_{SubK}$, .... In this way, the effect is achieved that different maskings are available for application. This effect increases security in comparison to a method in which only one table $Tab1S_{SubK}$ is employed, but also the memory requirements.

Optionally, the algorithm comprises several rounds, and the new masked tables $TabS_{Kneu}$ of different rounds are generated at least partly or all from different ones of the masked tables $Tab1S_{SubK}$, $Tab2S_{SubK}$, $Tab3S_{SubK}$, .... The effect is achieved thereby that different rounds are masked with different maskings. This effect increases security, but unfortunately also the memory requirements.

The processor device further comprises optionally a transaction application implemented in the processor device, said transaction application being adapted to request a transaction employing the implemented implementation of the algorithm according to the invention. As a transaction, in particular any one of the transactions described at the outset can be provided, such as a payment transaction, etc.

In a method for changing the secret Key K according to the invention in a processor device according to the invention, a key change is performed from an old key Ka to a new key Kn. The change of the key K from the old key Ka to the new key Kn is performed by generating new tables $TabS_{SubKn}$ for all tables provided in the implementation, referred to as old $TabS_{SubKa}$, and replacing the old tables $TabS_{SubKa}$ by the new tables $TabS_{SubKn}$. The new tables $TabS_{SubKn}$ are generated from the old tables $TabS_{SubKa}$ by means of key change data. The key change data are computed employing key values SubKa derived from the old key Ka, new key values SubKn derived from the new key Kn and the employed input masking and/or output masking.

Optionally, the change of the secret key from the old key Ka to the new key Kn, in particular the generating of the new tables $TabS_{SubKn}$, is performed at the request of the application. In other words, the application itself can initiate a key update.

Optionally, the application is configured as an application for performing a transaction, in particular a payment transaction, in particular a cloud payment transaction, and wherein the change of the secret key from an old key to a new key is carried out each time upon performing a transaction.

In particular, it can be provided that the performance of a transaction is initiated by a transaction application, and at the request of the transaction application, in particular directly caused by the initiation of performing a transaction, a key update is initiated automatically. This ensures that a new key is employed for each single performance of a transaction effected under the direction of the transaction application—in particular a cloud payment transaction.

In the application case of the (cloud-payment) transaction application which initiates the key update itself before each single performance of a transaction, one of the advantages of the invention unfortunately cannot be exploited fully when the application initiates the key update for the current transaction, namely the saving of computing time at runtime. When a (payment) transaction is initiated by the transaction application, the algorithm is executed as well. According to the invention, initially the masked table containing a key still present in the algorithm is replaced by a new masked table containing a new key. Subsequently the algorithm is executed and a table call is performed in the new table. In this application case, thus the full time expenditure for the updating of tables and/or key update affects the transaction duration, i.e. the amount of time needed to perform the transaction. However, the security benefits remain.

According to a further embodiment of the invention, the application initiates the key update after performing or at least after requesting the transaction. In this case, the new masked table based on the new key is implemented after the transaction, so that the new, i.e. updated, masked key-dependent table is available for the next transaction. The advantages with regard to runtime are maintained in this embodiment.

In still other application cases, the masked table, and thus the key, is updated previously, so that the amount of time for the table update does not affect the transaction time.

Also in general, the change of the secret key from an old key to a new key can be performed after performing a transaction with the old key ka, so that the new table $TabS_{SubKn}$ with the new key is implemented for the subsequent transaction. The transaction time which a transaction may claim is limited in many application cases, particularly in contactless transactions such as NFC transactions. By shifting the time-consuming creation of the new table to after the transaction, in preparatory work for the subsequent transaction, the transaction time of the respectively current transaction is kept short.

BRIEF DESCRIPTION OF THE DRAWINGS

In the following the invention will be explained in more detail on the basis of embodiment examples and with reference to the drawings, in which there are shown:

FIG. 3 a detailed representation of a single operation T in the DES round of FIG. 2;

FIG. 4 a white-box masking of a DES round according to FIG. 2 and FIG. 3, according to embodiments of the invention;

DETAILED DESCRIPTION OF EMBODIMENT EXAMPLES

Figure 1:
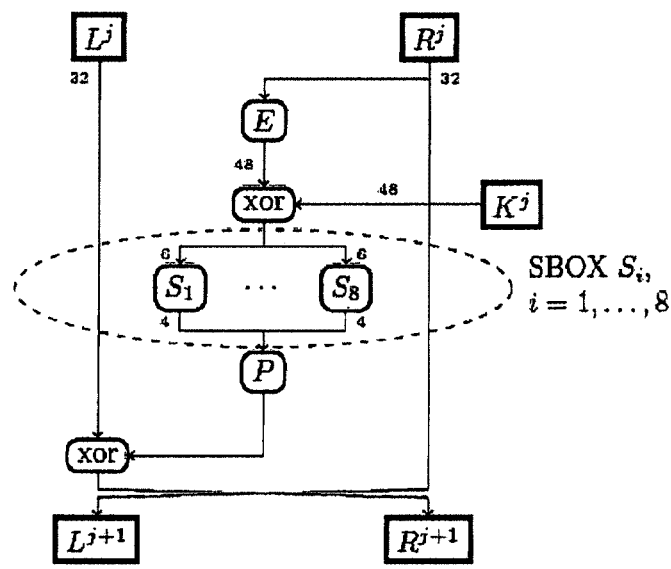
FIG. 1 a DES round in standard representation of the prior art, according to the prior art.

FIG. 1 shows a DES round of the prior art. The DES round comprises in particular also SBOX operations S1, . . . , S8, by which input values x=e XOR k are processed, wherein k=Kj are key values derived from the secret key K, namely round keys kj of the DES round under consideration.

Figure 2:
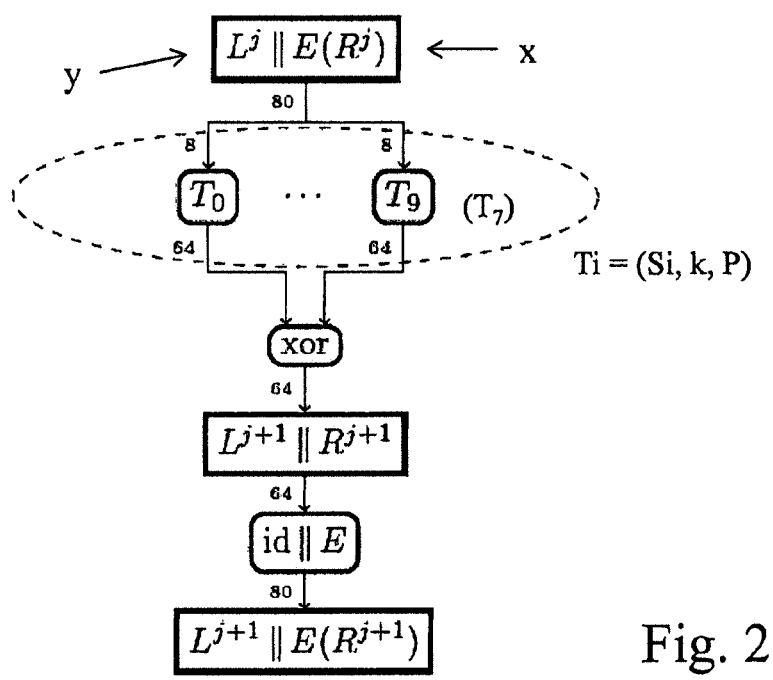
FIG. 2 a DES round in an alternative representation, with S-box operations S embedded in operations T, and particularly suitable as the basis of the invention.

FIG. 2 shows a DES round in an alternative representation, with S-box operations S embedded in operations or so-called T-boxes T, T=T0, . . . T9 (or T0, . . . T7), and particularly suitable as the basis of the invention. The round j processes a 48-bit round key kj. The round key kj is divided into 6-bit round key portion SubK. One round key portion SubK is processed by one of the T-boxes T=T0, . . . T7 in each case. Two further T-boxes process keyless values. More specifically, for Ti of the round j SubK=kj6i . . . kj6i+5, wherein i=0, . . . 7, i.e. in the T6 of the fifth round the 6 bits k (j=5, i=36) to k (j=5, i=41) are received, etc.

FIG. 3 shows a detailed representation of a single operation Ti in the DES round of FIG. 2 (wherein i is a value from 0, . . . 9 or from 0, . . . 7). Ti is implemented as a key-dependent computing step comprising the SBOX operation. Here, the key-dependent computing step Ti depends on 6 bits of the round key kj, hereinafter referred to as SubK. The key-dependent computing step Ti is implemented for the respective DES round as a key-dependent table $TabS_{SubK}$.

FIG. 4 shows a white box masking of a DES round according to FIG. 2 and FIG. 3, in accordance with embodiments of the invention. The output of each key-dependent computing operation Ti is masked with an invertible function f, which, according to FIG. 4, is formed for example by a linear mapping A which in turn is represented by a matrix MA, to form a masked key-dependent computing operation T'i. In FIG. 4 thus there applies to the masking operation f=A=MA. Here, the output bits of the computing operation Ti are designated by s0 . . . sn-1, y0, . . . ym-1.

The DES comprises 16 rounds. In each of the 16 DES rounds new round keys kj are known to be derived and employed. Conventionally, for the embodiment of FIGS. 2-4, 16 separately supplied key-dependent computing operations T'i would have to be supplied for the masked key-dependent computing operations T'i, comprising SBOX operations Si, of the 16 rounds of the DES.

According to the invention, the masked key-dependent computing operations T'i of a DES round can be derived from the respectively preceding DES round by means of key change data. In this case, only the masked key-dependent computing operations T'i and thus the key-dependent tables $TabS_{SubK}$ for a single round need to be stored. The key-dependent tables $TabS_{SubK}$ of the further rounds are successively computed by means of key change data proceeding from the stored key-dependent table $TabS_{SubK}$. Instead of from the directly preceding DES round, the round keys of a DES round can be derived by means of the suitably computed key change data from any other DES round, which is not necessarily the preceding round.

Further, by means of the technique of the key change data according to the invention, a key change from an old key Ka to a new key Kn can be performed on the complete DES algorithm in a comparatively easy manner. For this purpose, the key-dependent tables $TabS_{SubKa}$ for all 16 DES rounds, which initially depend on round keys SubKa which are formed proceeding from the old DES key Ka, are replaced by new key-dependent tables $TabS_{SubKn}$ depending on round keys SubKn which are formed proceeding from the new DES key Kn.

Subsequently key changes by means of key change data are shown with reference to two examples.

Example 1

To the input of the computing step S a derived key value k is assigned, f and g−1 are linear functions.
Sk: Computing step, with derived key value=k
x: Input value
k: Key value incorporated in computing step S
SBOX: SBOX table call in table SBOX
Sk(x)=SBOX(k XOR x)
Linear obfuscation of input and output of the table SBOX with linear mappings g−1 and f
$TabS_{SubK}$(x)=f SBOX(k XOR g−1(x))
Key change data: SWD=g (kneu XOR k) are XORed upon input.
This yields:
$TabS_{SubKneu}$(x)=f SBOX(kneu XOR g−1(x))=f SBOX(k XOR g−1(g(k XOR kneu)) XOR g−1(x))=f SBOX(k XOR g−1(g(k XOR kneu) XOR x)=f SBOX(k XOR g−1(SWD XOR x))

Example 2

To the output of the computing step S a derived key value k is assigned, f and g−1 are linear functions.
Sk: Computing step, if key value=k
x: Input value
k: Key value incorporated in computing step S
SBOX: SBOX table call
Sk(x)=k XOR SBOX(x)
Linear obfuscation of input and output with linear mappings g−1 and f
$TabS_{SubK}$(x)=S'k(y)=f(k XOR SBOX(g−1 x)), with y=g−1 x
Key change data: SWD=f (kneu XOR k) are XORed upon output.
This yields:
$TabS_{SubKneu}$(x)=S'kneu(y)=SWD XOR f (k XOR SBOX (g−1 x))=
f (kneu XOR k) XOR f (k XOR SBOX(g−1 x))=
f (kneu XOR k XOR k XOR SBOX (g−1 x))=
f (kneu XOR SBOX (g−1 x)).

In the examples 1 and 2 the simplest case, that g−1 and f are linear mappings, was initially proceeded from. If g−1 and f are non-linear, additional auxiliary data are required for computing S'kneu(y). In other constructions of Sk(x), more specifically when both of the input and the output of the computing step (of the SBOX) are concerned by a key change, it is required to modify both input and output when changing the key value k.

Figure 5:
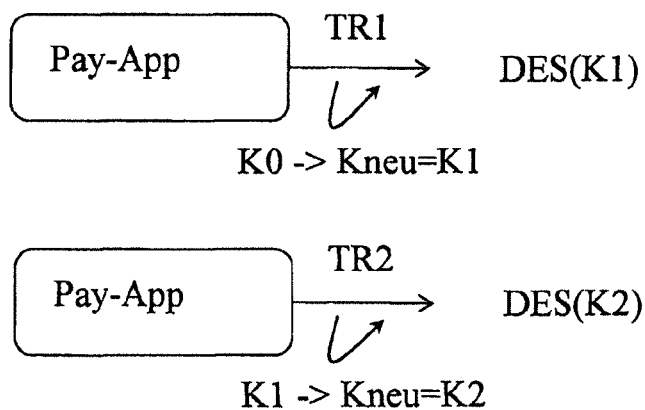
FIG. 5 two performances of a payment transaction under the direction of a transaction application, according to a first embodiment of the invention.

FIG. 5 shows, according to a first embodiment of the invention, a schematic representation of two performances TR1, TR2 of a payment transaction under the direction of a transaction application Pay-App that uses a DES according to the invention. The DES is initially implemented with a key K0, with a table $TabS_{SubK}$ masked with a masked table. As soon as the application Pay-App initiates a transaction TR1, an update of the key K0 to a new key K1 is initiated. Subsequently the transaction TR1 is performed with the new key K1. Here, a DES is performed with the new key K1, with a table call in the masked table $TabS_{SubK1}$. The DES is now implemented with a key K1, with a masked table $TabS_{SubK1}$. As soon as the application Pay-App initiates a subsequent transaction TR2, an update of the key K1 to a new key K2 is initiated. Subsequently the transaction TR2 is performed with the new key K2. Here, a DES is performed with the new key K2, with a table call in the masked table $TabS_{SubK2}$.

Figure 6:
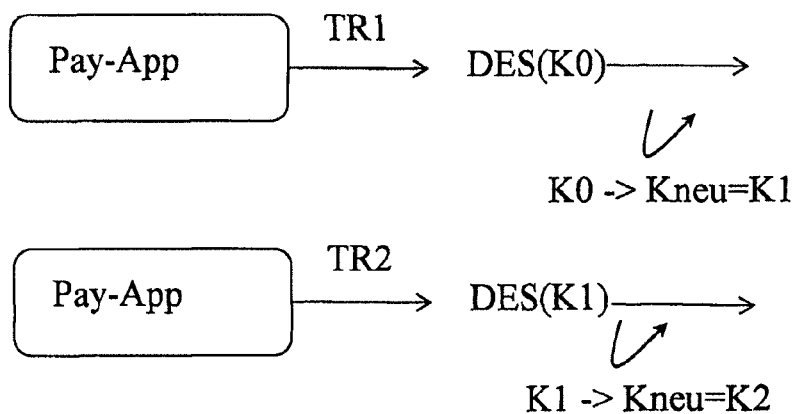
FIG. 6 two performances of a payment transaction under the direction of a payment application, according to a second embodiment of the invention.

FIG. 6 shows a schematic representation of two performances of a payment transaction TR1, TR2 under the direction of a transaction application, according to a second embodiment of the invention. The transaction is likewise effected under the direction of a transaction application Pay-App that uses a DES according to the invention. The DES is initially implemented with a key K0, with a table $TabS_{SubK0}$ masked with a masked table. As soon as the application Pay-App initiates a transaction TR1, the transaction TR1 is performed with the implemented key K0. Subsequently, an update of the key K0 to a new key K1 is initiated, in some cases without the possibility of intervention by the user. As soon as the application Pay-App initiates a subsequent transaction TR2, the transaction TR2 is performed with the new key K1 updated subsequently to the previous transaction. Here, a DES is performed with the new key K1, with a table call in the masked table $TabS_{SubK1}$. Subsequently, an update of the key K1 to a new key K2 is initiated. A subsequent third transaction TR3 would now comprise a table call to a masked table $TabS_{SubK2}$ based on the key K2. Between the individual transactions TR1, TR2, . . . extended periods of time can elapse in which the processor device or the device in which the processor device is installed, can also be turned off.

CITED PRIOR ART

[1] "A Tutorial on White-box AES", James A. Muir, Cryptology ePrint Archive, Report 2013/104, eprint.iacr.org/2013/104
[2] DE 10 2014 016 548.5 (filed on Oct. 11, 2014)
[3] "Differential Computation Analysis: Hiding your White-Box Designs is Not Enough", J. W. Bos, Ch. Hubain, W. Michiels, and Ph. Teuwen, eprint.iacr.org/2015/753, retrieved on Jul. 31, 2015
[4] "A White-Box DES Implementation for DRM Applications", S. Chow, P. Eisen, H. Johnson, P. C. van Oorschot, pre-proceedings for ACM DRM-2002, Oct. 15, 2002, https://crypto.stanford.edu/DRM2002/whitebox.pdf
[5] WO 2010 146139 A9

The invention claimed is:
1. A processor device with an executable implementation of a cryptographic algorithm implemented thereon, which is adapted to produce an output text from an input text, employing a secret key K, wherein the implementation of the algorithm:
comprises a masked key-dependent computing step T' which comprises a key combination of input values derived directly or indirectly from the input text and key values SubK derived directly or indirectly from the key;
the masked key-dependent computing step T' is represented by a table which is masked with an input masking and/or output masking to form a masked table $TabS_{SubK}$;
the processor device comprises a key update device adapted to perform a key update method from the derived key value SubK to a new derived key value SubKneu on the masked key-dependent computing step T'; and
wherein in the key update method key change data are supplied to the processor device, in particular to the key update device, said key change data being computed employing the derived key value SubK, the new derived key value SubKneu and the employed input masking and/or output masking;
wherein:
in the key update method further a new masked table $TabS_{Kneu}$ is generated by means of the key change data in the processor device, in particular in the key update device, said new masked table being adapted to newly compute the key-dependent computing step S for the new derived key value $Sub_{Kneu}$ by means of the new masked table $TabS_{Kneu}$.

2. The processor device according to claim 1, wherein the key change data have lower memory requirements than the masked table.

3. The processor device according to claim 1, wherein the algorithm comprises several rounds j=1, . . . , n,
as the derived key value SubK a round key part of a round key kj of a round j is provided that is processed by the masked key-dependent computing step T', and
as the new derived key value SubKneu a round key part of a round key of a different round l, in particular of a round j+1 subsequent to the round, is provided that is processed by the masked key-dependent computing step T',
so that by means of the key change data from the masked table $TabS_K$ of the round there is derived the new masked table $TabS_{Kneu}$ of a different round, in particular the subsequent round.

4. The processor device according to claim 3, comprising a multiplicity of n, in particular 10 (AES) or 16 (DES), rounds, wherein for part of the rounds the respective new masked table $TabS_{Kneu}$ is derived employing key change data from the respective masked table $TabS_K$ of a different round, in particular of a round preceding the round.

5. The processor device according to 1, wherein the processor device is adapted, at runtime, while the algorithm is executed on the processor device, to supply for the computing step S two or several tables which are masked with two or several different input maskings and/or output maskings to form masked tables $Tab1S_{SubK}$, $Tab2S_{SubK}$, $Tab3S_{SubK}$, . . . , wherein the new masked table $TabS_{Kneu}$ is generated from one of the masked tables $Tab1S_{SubK}$, $Tab2S_{SubK}$, $Tab3S_{SubK}$, . . . .

6. The processor device according to claim 5, wherein the algorithm comprises several rounds, and
at least some or all of the new masked tables $TabS_{Kneu}$ of different rounds are generated from different ones of the masked tables $Tab1S_{SubK}$, $Tab2S_{SubK}$, $Tab3S_{SubK}$, . . . .

7. The processor device according to claim 1, further comprising a transaction application implemented in the processor device, which is adapted to request a transaction employing the implementation of the algorithm implemented.

8. A method for changing the secret key K in a processor device according to claim 1, from an old key Ka to a new key Kn,
- wherein the change of the key K from the old key Ka to the new key Kn is performed by generating new tables $TabS_{SubKn}$ for all tables provided in the implementation, referred to as old $TabS_{SubKa}$, and replacing the old tables $TabS_{SubKa}$ by the new tables $TabS_{SubKn}$,
- wherein the new tables $TabS_{SubKn}$ are generated from the old tables $TabS_{SubKa}$ by means of key change data (SWD),
- wherein the key change data (SWD) are computed employing key values SubKa derived from the old key Ka, key values SubKn derived from the new key Kn and the employed input masking and/or output masking.

9. The method according to claim 8, wherein the change of the secret key from the old key Ka to the new key Kn, in particular the generating of the new tables $TabS_{SubKn}$, is performed at the request of the application.

10. The method according to claim 9, wherein the application is configured as an application for performing a transaction, in particular a payment transaction, in particular a cloud payment transaction, and wherein the change of the secret key from an old key Ka to a new key Kn is performed upon each performance of a transaction.

11. The method according to claim 8, wherein the change of the secret key from an old key Ka to a new key Kn is performed after a performance of a transaction with the old key Ka, so that the new table $TabS_{SubKn}$ with the new key is implemented for the subsequent transaction.

* * * * *